March 24, 1953 V. E. MARK ET AL Re. 23,636

MAGNETIC DOOR CLOSURE AND SEAL

Original Filed July 27, 1944 2 SHEETS—SHEET 1

Inventors
Lloyd L. Anderson
Vennice E. Mark
By Liverance and Van Antwerp
Attorneys

MAGNETIC DOOR CLOSURE AND SEAL

Original Filed July 27, 1944 2 SHEETS—SHEET 2

Inventors
Lloyd L. Anderson
Vennice E. Mark
By Livernance and Van Antwerp
Attorneys Reissued Mar. 24, 1953

Re. 23,636

UNITED STATES PATENT OFFICE 23,636

MAGNETIC DOOR CLOSURE AND SEAL

Vennice E. Mark, and Lloyd L. Anderson, Grand Rapids, Mich., assignors to Winters & Crampton Corporation, Grandville, Mich., a corporation of Michigan Original No. 2,471,635, dated May 31, 1949, Serial No. 546,889, July 27, 1944. Application for reissue December 31, 1949, Serial No. 136,342

24 Claims. (Cl. 20—69)

Matter enclosed in heavy brackets [ ] appears in the original patent but forms no part of this reissue specification; matter printed in italics indicates the additions made by reissue.

This invention relates to door closures and seals therefor and is more particularly directed to the closing and sealing of doors such as refrigerator doors through magnetic attraction with the release of the door and its opening through magnetic repulsion.

It is important in connection with refrigerators that the doors which are at times momentarily opened for access to its contents shall when closed be snugly and tightly sealed entirely around the door to prevent the entrance of heat from the outside to thereby minimize the cost of refrigeration and the wear upon the refrigerating machinery consequently increasing efficiency. The manufacture of doors and of the casing for refrigerators so as to produce an accurate seal in connection with hand operated closing latches for the doors requires close tolerances in order that the sealing gasket which is used between the door and refrigerator case shall be as uniformly pressed upon at all points as possible and not have a part of the gasket over compressed and other parts thereof compressed to a much less degree. The present invention provides an effective seal and closure for a refrigerator door even though the surfaces of the door and of the front edges of the casing against which the door engages, and between which and the door the sealing gasket is located, are not manufactured with as close tolerances as heretofore required though the provision of a novel door sealing gasket of a flexible nature which carries magnetic means for attracting armatures mounted on the door toward said magnetic means, thereby drawing the door into close sealing engagement with the gasket, the sealing being immediately between the outer side of the flexible gasket and the adjacent contacting surfaces at the inner side of the door, this irrespective of the degree of compression and forcing inward of the body of the gasket which may vary in accordance with the surface to which the gasket is attached and the complementary surface on the door engaging against the outer side of the gasket.

It is a primary object and purpose of the present invention to provide a magnetically operated door closure and sealing construction, particularly adapted for refrigerators and to further provide a practical, simple effective and economical means for releasing the door closure for opening whenever required to cause a magnetic repulsion between the parts which normally are magnetically attracted, and with parts of the elements which are thus magnetically attracted or repulsed flexibly and movably mounted in connection with a sealing gasket so as to conform to irregularities of surface against which they are in contact engagement when the doors are in closed position; thereby providing a sure and effective seal entirely around the door or similar closure.

An understanding of the invention may be had from the following description taken in connection with the accompanying drawings, in which Fig. 1 is a front elevation of a conventional refrigerator with the door in open position illustrating the place of application of my invention.

Life reference characters refer to like parts in the different figures of the drawings.

The refrigerator 1 has an opening at the front through which the placing or removal of the contents of the refrigerator is made, said opening being closed by a door 2 hinged at one vertical edge at the usual and conventional manner. In the form of my invention as illustrated the door 2 has an outside sheet metal member 3 at the inner side of which, at least adjacent the upper and lower side edges of the door, is a plate 4 of non-magnetic material. The specific construction of the door, its heat insulation and the like forming no part of the present invention, are not shown and described.

Figure 1:
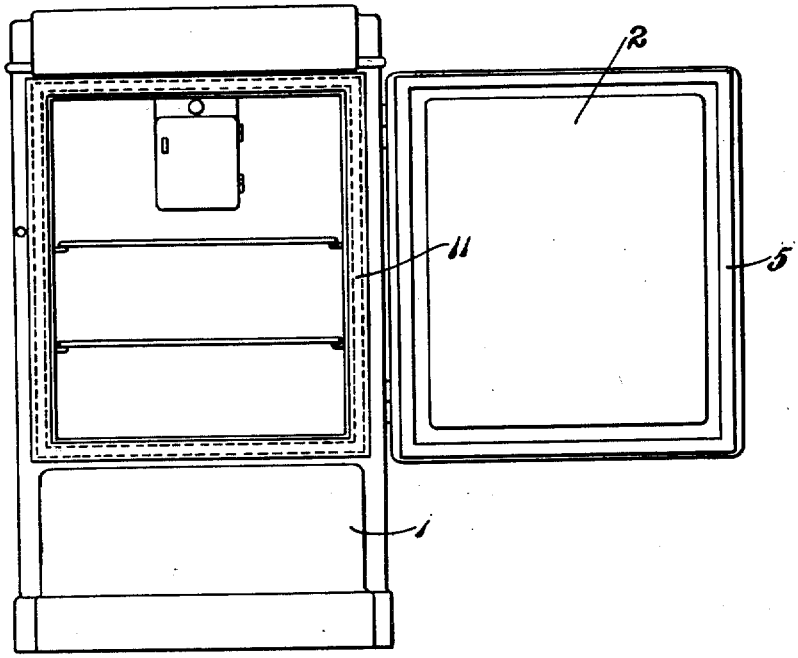
Figure 2:
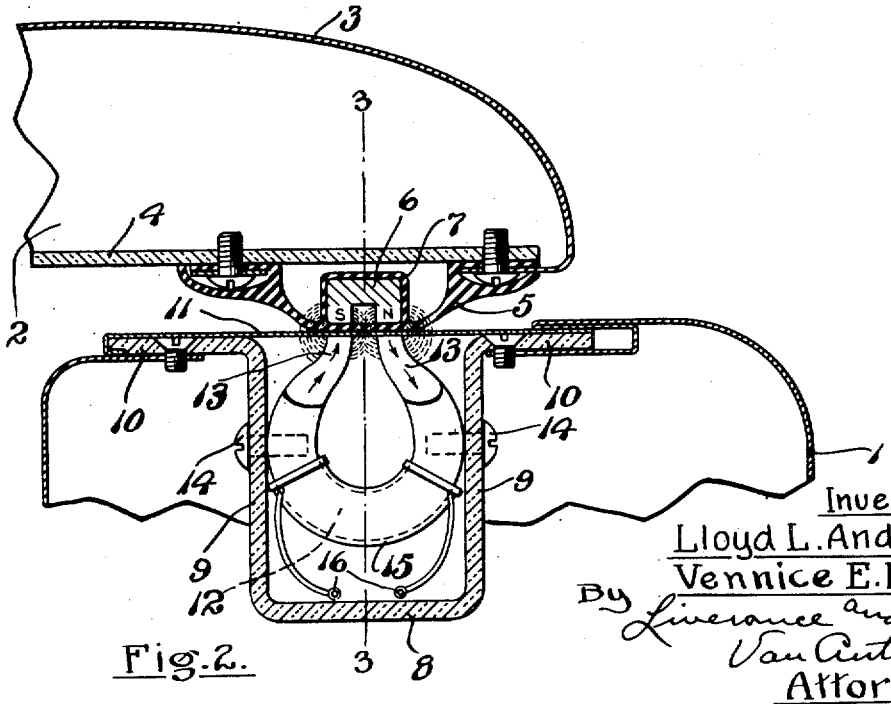
Fig. 2 is a fragmentary enlarged horizontal section through an edge of the door and the adjacent portion of the refrigerator casing with the door in closed position.

Upon the inner non-magnetic member 4 a flexible gasket 5 of rubber or similar elastic sealing material is secured by means of screws or equivalent fastenings. The gasket 5 extends entirely around the inner face of the door adjacent its edges and said gasket between its side edges has a central thin flexible portion spaced away from the plate 4 and providing a continuous elongated chamber within which a plurality of permanent magnets 6 are located in succession around the outer edge portions of the door being secured within an integral inner covering 7 of the same material as and molded with the gasket 5. While in practice the plurality of magnets are preferably approximately six inches in length, such specific length of the magnets is not any essential feature of the invention as the lengths may be varied. The magnets are U-shaped in cross section, the spaced legs thereof providing opposite poles, as indicated in Fig. 2, one being indicated as the north and the other the south pole by the respective characters N and S. The outer edges of said legs of the magnet are against the inner side of the thin flexible central portion of the gasket 5 as shown.

Around the opening in the refrigerator which is closed by said door the refrigerator casing is provided with channel shaped supports of non-magnetic material having an inner web 8 and spaced parallel sides 9 which are turned outwardly in flanges 10 as shown. Said channels are inserted in the refrigerator casing at the top, bottom and sides of the opening which is closed by the door, and are secured to the adjacent parts of the refrigerator 1 by screws or other suitable connections. The outer open sides of the channels are closed by thin plates 11 also of non-magnetic material. When the door is closed the central flexible portions of the gasket 5 entirely around the door at its inner side come against the thin flexible non-magnetic plates 11 approximately midway between the sides 9 of the channels described.

Figure 3:
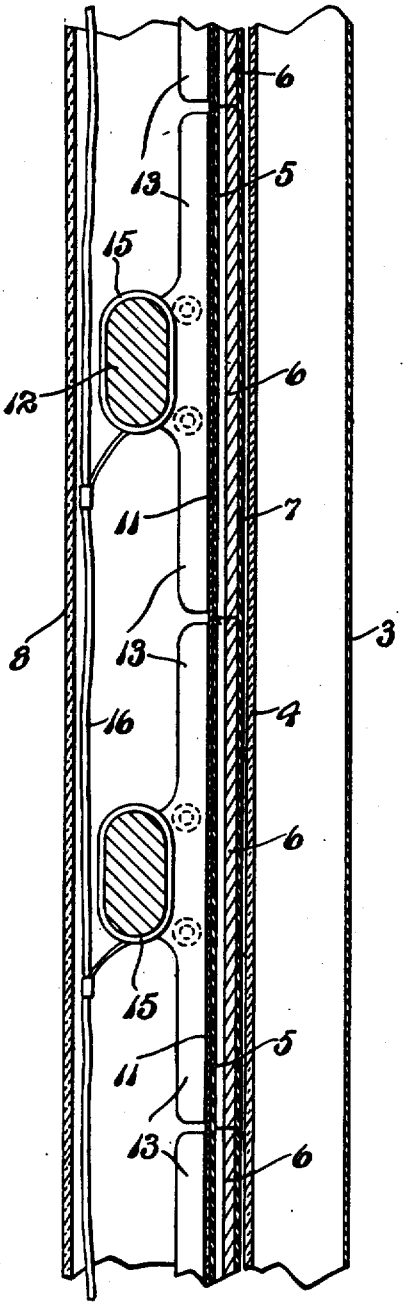
Fig. 3 is a fragmentary enlarged vertical section substantially on the plane of line 3—3 of Fig. 2.
Figure 4:
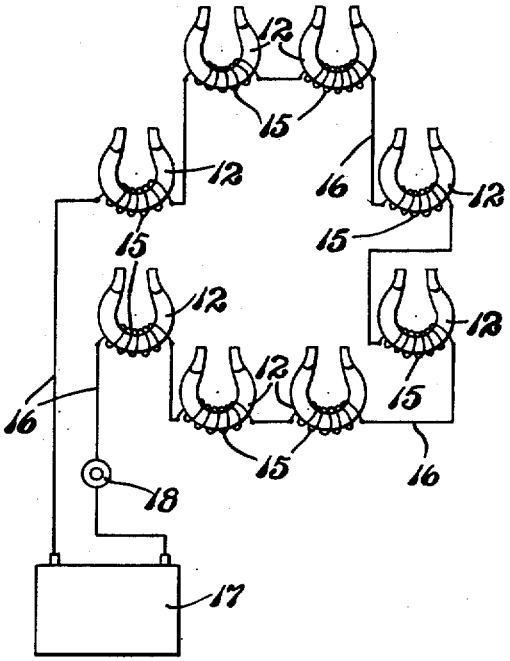
Fig. 4 is a diagrammatic view illustrative of the armatures which in practice are carried on the refrigerator casing and which by closing the electric circuit become the cores of electromagnets in opening the door closure by magnetic repulsion.

Within the channel supports a plurality of armatures 12 are mounted in spaced relation to each other, each being bent into an approximately U-shape and with the free ends elongated and extended from the central U-shaped portion in both directions therefrom as shown at 13 in Fig. 3 providing in effect bars, the surfaces of which are directly opposite the poles of the permanent magnets 6. With the lengths of the magnets approximating six inches the total over all lengths of the bar portions 13 will likewise be approximately six inches to conform with magnets 6 with which they are associated. The several armatures described are held in place by suitable fastenings, for example, screws 14 passing through the sides 9 of the channel supports therefor.

It is evident that said armatures made of soft iron or other equivalent magnetic material will be attracted by the magnet 6 when the refrigerator door is shut causing the door to be held shut securely throughout the entire length of the seal and thus insure an air tight condition around the peripheral portions of the door. Any imperfection of fit in the door or hinges does not affect the secure operation of the seal as the seal is governed wholly by magnetic force instead of the conventional mechanical force of the door being held in place as by a latch. The flexibility of the seal insures a true and substantially perfect sealing contact.

The armatures at 12 may be converted into cores of electromagnets. Windings 15 around the intermediate portions of the armatures 12 connected in series by circuit wires 16, with said circuit wires connected with a source of electric current, conventional indicated at 17, provide a construction such that when electric current is passed through the circuit and through said windings, cause said armatures to become the cores of electromagnets, the opposite end bars 13 being opposite poles of said magnets. Normally the circuit at 16 is open but may be closed by a switch interposed in the circuit diagrammatically indicated at 18. When the switch is closed and an electric current flows through the circuit and magnet windings included therein, the terminal bars 13 of the armatures 12 being placed opposite the poles of electromagnets 6, and with the current directed in the proper direction so that like poles of said electromagnets just made and of the permanent magnet 6 oppose each other, there is a magnetic repulsion which not only releases the seal but releases and repels the door for opening. As soon as the switch at 18 is released so that the circuit is interrupted the bars 13 at the ends of the armatures 12 become again simply armatures which are attracted by the magnets 6 when the door is closed so as to move them within the range of the fields of attraction of said magnets.

The switch at 18 for example may be a push button switch automatically released upon pressure being removed therefrom. To obtain repulsion between the magnets and the electromagnets thus momentarily produced it is necessary to pass direct current or a uni-directional pulsating current through the circuit and windings thereof. The source of electrical energy, indicated at 17, which might be a battery but in general would be taken from the electric wiring of the house where the refrigerator is located, if not of this direct or uni-directional pulsating current required, that is, if it was alternating current as ordinarily found in the household, is changed to direct or uni-directional pulsating current by using a rectifier, well known for such purposes.

The invention described is practical, economical and effective. It is very desirable in connection with the reduction of cost in the manufacture of the door and of the parts of the refrigerator between which and the door the sealing gasket is placed, getting away from the close and, therefore, necessarily costly tolerances previously required for the production of a substantially uniform sealing. While the gasket carrying the magnet is mounted upon the door and the armatures which may be at will transformed into the cores of electromagnets are mounted on the refrigerator casing, it is to be understood that a reversing of such positions is within the scope of our invention. Other changes in position, reversal of parts or equivalents are to be understood as comprehended by our invention as defined in the appended claims.

We claim:

1. The combination, members including a door and a casing having a door opening which the door is to close, one of said members carrying a flexible gasket of a shape to surround said door opening securely attached to said member, said gasket being provided with magnets therein and movable therewith in the flexing of said gasket, the other of said members being provided with armatures having end portions to lie in opposition to the poles of said magnets when the door is closed and be attracted thereto, windings connected around said armatures in an electric circuit, a source of electric current connected with said circuit, and a switch in said circuit whereby closing the circuit will change said armatures into cores of electromagnets having poles in conjunction with the poles of the magnets carried by said gasket to create repulsion to release the door and casing from each other.

2. The combination including a door and a door jamb therefor, said door carrying a flexible gasket adapted to be brought into engagement with and pressed against the door jamb, said gasket being provided with a magnet lengthwise thereon and said door jamb being provided with an electromagnet having a core, the end portions of which are in the field of magnetic attraction of said magnet when the gasket is brought against said door jamb, and means for energizing the electromagnet to create repulsion between it and the magnet carried by said flexible gasket.

3. The combination including a door and door jamb members, of a flexible gasket on one of said members adapted to be brought against the other when the door is moved to said jamb, said gasket being provided with a permanent magnet lying lengthwise thereof and the member to which the gasket is not attached being provided with an electromagnet normally not energized, and means for energizing the electromagnet to create repulsion between it and the permanent magnet carried by said gasket.

4. In combination, a door having a flexible readily yieldable sealing gasket at its inner side adjacent its peripheral edges, a casing having an opening surrounded by door jambs against the surfaces of which said gasket is brought when the door is closed, magnetic means carried by said casing adjacent the surfaces of said door jambs against which the gasket bears and cooperating magnetic means carried by said gasket for creating magnetic attraction to press said gasket against said door jamb surfaces, and electric means for breaking said magnetic attraction and creating repulsion to release the door and repel it from said door jambs.

5. A case having an opening therein closed by a door, a door for closing the opening movably mounted on the case, a flexible gasket carried by the door to surround said opening and bear against said case around the opening when the door is closed, a plurality of permanent magnets located in the length of and within the gasket and movable therewith, a plurality of armatures having end portions formed into bars which parallel the poles of said permanent magnets and are in close proximity thereto when the door is closed, said armatures being of soft ferrous material attracted by said magnets, and an electrical means for converting all of said armatures into impermanent magnets having poles directly opposite like poles of the permanent magnets carried by said gasket, as specified.

6. A construction having the elements in combination defined in claim 5, and supporting means of elongated channel form mounted at said casing around the door opening therein having the open sides of the channels presented outwardly, means for supporting said armatures within said channel supports, and covering members of nonmagnetic material secured to and over the open sides of said channel supports against the inner side of which the ends of said armatures are located.

7. In a construction of the class described, a sealing gasket for application to doors comprising an elongated member of flexible compressible nonmagnetic material, means at the longitudinal edge portions of said gasket for securing it to a door, the intermediate longitudinal portion of said gasket being of thin section and providing a continuous longitudinal enclosed chamber between it and the surface of the door to which attached, an elongated permanent magnet, substantially U-shape in cross section, located within said chamber longitudinally thereof, and a covering and holding envelope for said magnet of the same material as and integrally formed with the gasket, as specified.

8. A sealing gasket for refrigerator doors comprising, an elongated member of flexible, compressible, nonmagnetic plastic material provided with edge portions at its sides adapted to be located against and secured to the face of a door, and with an integral thin arched elongated intermediate portion between said attaching edge portions, a plurality of permanent magnets located in end to end relation at the inner side of said intermediate portion of the gasket, said permanent magnets being substantially U-shape in cross section, and with the ends of the legs thereof bearing against the inner sides of the gasket to thereby present their poles toward the outer side of the gasket, and means of nonmagnetic material securing said magnets to said gasket.

9. In a construction of the class described, a support of nonmagnetic material having spaced apart sides adapted to be secured at the front of and inserted into a door jamb, a covering of nonmagnetic material between said sides of the support at the face of said door jamb, a plurality of cores of soft iron substantially U-shaped in form located between and mounted upon said sides of the support, the legs of said cores extending toward said plate and terminating in bars substantially paralleling each other having their outer faces in substantially contacting engagement with the inner side of said plate, and electric circuit windings around the cores at an intermediate portion thereof adapted to be connected with an electric circuit for controlled passage of electric current through the windings, as specified.

10. The combination of a door member and a door jamb member for the door member, each of said members being provided with magnets one of which is an electric magnet, said magnets having pole faces brought into adjacent relationship when the door is closed, and adapted when the door is closed to attract each other and hold the door closed, means for mounting and supporting one of said magnets said means providing a seal between the door member and jamb member when said members are brought together, and means for selectively energizing said electromagnet to cause the ends of the core thereof to have a like polarity with those of the other magnet to repel the door member from said jamb member.

*11. In a construction of the class described, a casing member having a door opening therein, a door member for closing said opening, a sealing gasket of compressible material secured to one of said members and extending entirely around the inner face of the door adjacent its edges when said gasket is in sealing position, one face portion of the gasket being adapted when the door member is closed and the gasket is in said sealing position to abut against the member to which it is not secured, said gasket being provided with an interiorly disposed channel attached to the inside face of said member-abutting portion of the gasket, magnetically attractable material disposed linearly of said gasket and formed so that said gasket may flex as it is moved into sealing position to accommodate any imperfection in the face-to-face fit between said members, the other member having magnetically-attractable material as part thereof, said latter material being substantially coextensive at least linearly with the gasket magnetically attractable material when said door is closed, at least one of said magnetically-attractable materials being magnetized, to cause the mating attraction between the two members to close said door against said casing and compress said gasket in sealing relation therebetween.*

*12. In a construction of the class described,*

*a casing member having a door opening therein, a door member for closing said opening, a sealing gasket of compressible material secured to one of said members and extending entirely around the inner face of the door adjacent the door edges when in sealing position, one face portion of the gasket being adapted to abut against the member to which it is not secured when the door is closed and the gasket is in sealing position, at least one of the longitudinal side edge portions of said gasket normally abutting the member to which the gasket is secured, said gasket including an interiorly disposed channel spaced away from said one member and adjacent said other member when said door is in closed position, magnetically attractable means positioned within said channel and formed so that said gasket may be flexed to accommodate imperfections in fit between said members, and the other of said members having magnetically-attractable means as part thereof, at least one of said last two recited means being magnetized and said two means being so located with respect to said members and said gasket as to be magnetically attracted to each other over substantially the entire length of said gasket when said door member is in closed position thereby to effect a seal between said gasket and said other member.*

*13. In a construction of the class described, a casing member having a door opening therein, a door member for closing said opening, a sealing gasket of compressible material secured to one of said members and extending entirely around the inner face of the door adjacent the door edges when in sealing position, one face portion of the gasket being adapted to abut against the member to which it is not secured when the door is closed and the gasket is in sealing position, said gasket having longitudinally extending side edge portions normally abutting the member to which the gasket is secured and at least a part of the inwardly disposed longitudinal side edge portion being flexibly displaceable from the member to which the gasket is secured, said gasket including an interiorly disposed channel spaced away from said one member and adjacent said other member when said door is in closed position, magnetically-attractable means positioned within said channel and formed so that said gasket may be flexed to accommodate imperfections in fit between said members, and said other member having magnetically-attractable means as part thereof, at least one of said last two recited magnetically-attractable means being magnetized and said two means being so located with respect to said members and said gasket as to be magnetically attracted to each other over substantially the entire length of said gasket when said door member is in closed position thereby to effect a seal between said gasket and said other member around the peripheral portions of the door.*

*14. A casing having an opening therein, a door movably mounted on said casing for closing the opening, a flexible gasket extending entirely around the inner face of the door adjacent its edges to form an air seal for said casing when said door is closed, a plurality of magnets located lengthwise of and within said gasket, said casing having as part thereof magnetically attractable portions in mateable relation at least with said gasket magnets to attract said door into air-sealing relation with the casing, and means comprising a member operable from the exterior of the casing for disabling said magnetic door-*

*holding and causing said door to be forced open and away from said casing.*

*15. In a construction of the class described comprising a casing member having an opening and door member for closing said opening, a sealing gasket adapted to extend entirely around the inner face of the door member adjacent its edges and comprising an elongated member of flexible compressible nonmagnetic material having longitudinally extending edge portions and a longitudinally extending portion intermediate said edge portions, at least one of the longitudinally extending edge portions of said gasket formed to adapt it to be secured to one of said members, the longitudinal portion of said gasket intermediate its edges being of thin section and providing a continuous longitudinal enclosed chamber between it and the surface of the member to which attached, and an elongated permanent magnet whose emanant flux patterns are similar to those from U-shaped magnets located within said chamber and extending longitudinally thereof.*

*16. A sealing gasket for refrigerator doors comprising an elongated member of flexible compressible, nonmagnetic material provided with edge portions at its sides which portions are adapted to be located against the face of a door and with an integral thin arched elongated intermediate portion between said edge portions, a plurality of permanent magnets located in end-to-end relation at the inner side of said intermediate portion of the gasket, said permanent magnets having flux-line patterns similar to those from U-shaped magnets and the flux lines therefrom impinging against the inner side of the gasket and passing outwardly of the outer side of the gasket, and means of nonmagnetic material securing said magnets to said gasket.*

*17. In a construction of the class described, a casing having an opening therein, a door member mounted for movement into and out of air-sealing abutment with the casing surrounding said opening, a sealing gasket of flexible material having a longitudinally-extending edge portion thereof secured to one of said members along the sealing periphery thereof and said gasket being abuttable with the other of said members when said door is closed, said gasket including an internally arranged magnetically attractable portion comprising a plurality of individual aligned elements, the other of said members having magnetically attractable portions arranged at least along the line of abutment of said gasket with said other member, at least one of said portions being magnetized, whereby said gasket and said other member are magnetically attracted and sealed over substantially the entire door-sealing periphery when the door is moved into magnetic proximity to the casing, said magnetically attractable portion of said gasket being movable a sufficient distance with respect to the member on which the gasket is mounted to permit the magnetic attraction between said gasket and said other member to bring said movable gasket portion into continuous sealing contact with said other member in spite of irregularities in the gasket-engaging surface thereof.*

*18. In a construction of the class described, a casing member having an opening therein, a door member mounted for movement into and out of air-sealing abutment with the casing portion surrounding said opening, a sealing gasket of flexible material having inner and outer side edge portions extending longitudinally of its*

*length and being secured to the member with the longitudinal dimension of said gasket extending peripherally around said opening when said gasket is in sealing position, at least one of which edge portions is secured to one of said members along the length of the seal around the peripheral portions of the door and said gasket being abuttable with the other of said members when said door is closed, said gasket including an internally arranged magnetically attractable portion comprising a plurality of individual aligned elements, the other of said members having a magnetically attractable portion arranged at least along the line of abutment of said gasket with said other member, at least one of said portions being magnetized to cause said gasket and said other member to be magnetically attracted and sealed over substantially the entire door seal when the door is moved into magnetic proximity to the casing, said gasket including a channel in which said magnetically attractable aligned members are carried, the channel and aligned members being movable a sufficient distance with respect to the member on which the gasket is mounted to permit the magnetic attraction between said gasket and said other member to bring said movable gasket portion into continuous contact with said other member throughout the length of the seal around the peripheral portions of the door in spite of irregularities in the gasket-engaging surface thereof.*

*19. In a construction of the class described, a casing member having an opening therein, a door member movably mounted to close said opening, a sealing gasket of flexible compressible material secured to one of said members at the face thereof and extending the length of the seal around the peripheral portions of the door, a permanent magnet positioned in said gasket so that the latter may be flexed and sufficiently coextensive linearly therewith that upon the same being brought into magnetically attractable distance from the other of said members, said other member having as a part thereof material which is magnetically attractable at least throughout the same linear dimension as said gasket, the two members will be brought automatically together to compress said gasket in sealing relation between said members.*

*20. In a construction of the class described, a casing member having an opening therein, a door member movably mounted to be brought into closing relationship with the casing portion surrounding said opening, a sealing gasket of flexible compressible material secured to one of said members at the face thereof and extending the length of the seal around the peripheral portions of the door, said gasket being provided with an interiorly disposed channel attached to the inside surface of the member-engaging side of the gasket, a permanent magnet operable with said gasket so that said gasket may be flexed and sufficiently coextensive linearly therewith that upon the gasket being brought into magnetically attractable distance from the other of said members, said other member having magnetically attractable material extending at least throughout the same linear dimension as said gasket, the two members will be brought automatically together to compress said gasket in sealing relation between said members, said magnet comprising a plurality of short members of magnetic material disposed in touching end-to-end relation within the gasket channel.*

*21. A refrigerator casing having an opening*

*therein, a door movably mounted with respect to said casing for abutting the casing portion surrounding said opening and closing the latter, a flexible gasket carried by the door to surround said opening and bear against said cabinet around said opening when the door is closed, a magnetic entity associated lengthwise of and within said gasket, said casing comprising magnetically attractable areas positioned substantially opposite the effective portions of said gasket magnet entity as the door approaches closed position, said cabinet and gasket magnetic portions being jointly effective throughout the sealing length of said gasket to position the latter in air-sealing relation between the door and the casing when the opening in the latter is closed by said door.*

*22. A casing having an opening therein, a door for closing the opening movably mounted on the casing, a flexible gasket carried by the door to surround said opening and bear against said casing around the opening when the door is closed, a plurality of permanent magnets supported in association with said door lengthwise within the gasket and adapted to move said gasket towards the casing when they are attracted, said casing having as part thereof magnetically attractive portions positioned opposite the location of said door-carried magnets as said door moves to closing position wherefrom said door is air sealably closed with respect to said casing, and means cooperating with said magnetic door closure for disabling said magnetic attraction and opening said door.*

*23. As a subcombination adapted for use in connection with a casing member having an opening and a door member mounted on said casing and movable to close said opening, a product of manufacture consisting of a sealing gasket of flexible compressible material for sealing a perimetrical joint between the opening in such a casing member and such a door member, said gasket having a longitudinally-extending portion for securing to one of such members, and a second longitudinally-extending portion for releasably engaging the other of said members, and magnetically-attractable means located in said second portion of said gasket and extending over substantially the entire length thereof in sufficient proximity to render any predetermined length of said product magnetically attractable over its entire length.*

*24. As a subcombination adapted for use in connection with a casing member having an opening and a door member mounted on said casing and movable to close said opening, a product of manufacture consisting of a sealing gasket of flexible compressible material for sealing a perimetrical joint between the opening in such a casing member and such a door member, said gasket having a longitudinally-extending portion for securing to one of such members and a second longitudinally-extending portion for releasably engaging the other of such members and including a longitudinally-extending channel, and magnetically attractable means located in said channel and extending over substantially the entire length of said gasket in sufficient proximity to render any predetermined length of said product magnetically attractable over its entire length.*

VENNICE E. MARK.
LLOYD L. ANDERSON.

(References on following page)

REFERENCES CITED

The following references are of record in the file of this patent or the original patent:

UNITED STATES PATENTS

| Number | Name | Date |
|---|---|---|
| 451,603 | Sterry | May 5, 1891 |
| 2,203,580 | Ronning | June 4, 1940 |
| 2,252,144 | Taylor et al. | Aug. 12, 1941 |
| 2,288,688 | Dubilier | July 7, 1942 |
| 2,319,292 | Boggs | May 18, 1943 |
| 2,446,336 | Mark et al. | Aug. 3, 1948 |

FOREIGN PATENTS

| Number | Country | Date |
|---|---|---|
| 15,908 | Great Britain | 1884 |
| 538,226 | Great Britain | July 25, 1941 |